United States Patent [19]
Chetirko

[11] 3,994,614
[45] Nov. 30, 1976

[54] NO DIALING BORING HEAD, SIZING BLOCKS FOR STANDARD SIZES, SHIMS AND SPACERS WITH BLOCKS FOR INTERMEDIATE SIZES, OPTIONAL PIN HOLES FOR QUICK CHANGE

[76] Inventor: John Chetirko, 43 - 35 Union St., Flushing, N.Y. 11355

[22] Filed: Apr. 28, 1975

[21] Appl. No.: 572,463

[52] U.S. Cl. .............................. 408/116; 82/36 R; 408/186
[51] Int. Cl.² ........................................ B23B 49/00
[58] Field of Search ........... 408/186, 197, 187, 116; 33/201; 82/34 A, 33 A, 36 R, 45; 90/DIG. 13; 279/1 TE, 1 ME, 1 A, 6

[56] References Cited
UNITED STATES PATENTS

| | | | |
|---|---|---|---|
| 2,028,134 | 1/1936 | Brubaker | 82/34 A |
| 2,472,040 | 5/1949 | Brookfield | 279/6 |
| 3,408,885 | 11/1968 | Mendenhall | 82/36 R |
| 3,625,624 | 12/1971 | Fitzsimmons | 408/116 |
| 3,731,565 | 5/1973 | Bankhurst | 82/36 R X |

FOREIGN PATENTS OR APPLICATIONS

| | | | |
|---|---|---|---|
| 2,010,350 | 11/1971 | Germany | 408/197 |
| 22,586 | 10/1911 | United Kingdom | 408/186 |

*Primary Examiner*—Othell M. Simpson
*Assistant Examiner*—W. R. Briggs
*Attorney, Agent, or Firm*—Richard L. Miller

[57] ABSTRACT

An improved boring head assembly that is designed for being easily and accurately adjusted to different standard sizes of boring diameters so that it can be accomplished by persons without having a great deal of skill; the device consisting of a spindle for insertion into a chuck of a machine, and an adaptor adjustably mountable on the end of the spindle so to be axially offset a particular amount which is accomplished by means of specifically dimensioned blocks interchangeably placed therebetween, the adaptor serving to hold a boring bar which on its end retains a flying cutter.

2 Claims, 5 Drawing Figures

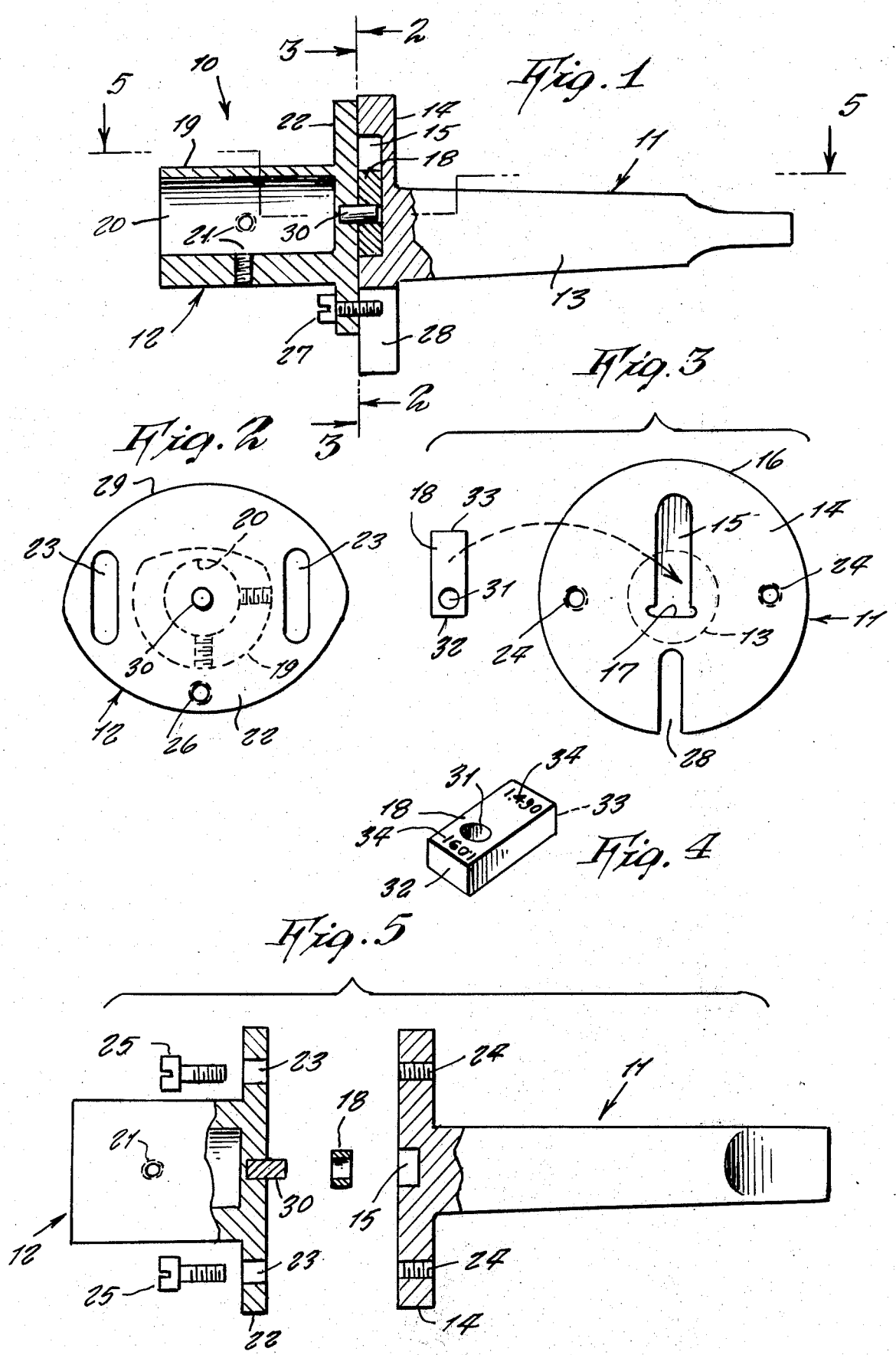

NO DIALING BORING HEAD, SIZING BLOCKS FOR STANDARD SIZES, SHIMS AND SPACERS WITH BLOCKS FOR INTERMEDIATE SIZES, OPTIONAL PIN HOLES FOR QUICK CHANGE

This invention relates generally to boring heads.

A principal object of the present invention is to provide an improved boring head which is quick and easy to set to an accurate standard size of boring diameter so that it can be done by anyone who is not a skilled machinist.

Another objects is to provide an improved boring head which accordingly will save labor for a master machinist, by delegation of the setting up work to others.

Other objects are to provide an improved boring head which is simple in design, inexpensive to manufacture, rugged in construction and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a side cross sectional view of the invention shown assembled.

FIG. 2 is a view in direction 2—2 of FIG. 1.

FIG. 3 is a view in direction 3—3 of FIG. 1 and showing parts separated.

FIG. 4 is a perspective view of one of the spacer blocks.

FIG. 5 is a view in direction 5—5 of FIG. 1, and showing the components separated.

Referring now to the drawing in detail, the reference numeral 10 represents an improved boring head according to the present invention wherein there is a spindle 11 for securing in a chuck of a machine, and an adaptor 12 which is adjustably mounted upon the spindle so that the central axes of the spindle and adaptor, while being parallel to each other, are disaligned a precise dimension.

The spindle consists of a tapering, straight shank 13 which at its wide end is integral with a round flange 14 having a long slot 15 on its outer side, the slot at one end intersecting and crossing the central axis of the spindle shank while the other end of the slot extends a radially longer distance toward a periphial edge 16 of the flange. The straight end edge 17 of the slot is located a precise distance away from the shank axis.

The present invention includes also a set of blocks 18 which are selectively placeable into the slot 15 for accomplishing the adjustment, and which will be described later herebelow.

The adaptor 12 includes a straight shank 19 having a cylindrical bore 20 at one end for purpose of receiving a boring bar and which is locked therein by set screws 21. The other end of the shank 19 is integral with a flange 22 for abutting against the outer side of the spindle flange 14.

A pair of parallel slots 23 through flange 22 align with threaded openings 24 in the flange 14 so to receive screws 25 for securing the flanges together in selectively adjusted position.

A single threaded opening 26 through the flange 22 receives a pilot screw 27 that extends into a slot 28 on the flange 14; the slot 28 being axially aligned with the block-receiving slot 15 and being also parallel to the axes of slots 23, as is best evident in FIGS. 2 and 3. It is therefore, readily apparent that the adaptor and spindle are adjustable relative to each other by shift along the axes of these slots. The peripheral edge 29 of the flange 22 is accordingly eliptical as shown in FIG. 2 so to not protrude excessively when shifted to its extreme positions.

A pin 30 protrudes from the outer side of the adaptor flange 22, the pin being aligned precisely on the axis of the bore 20, the pin extending into the block-receiving slot 15 of the spindle when the spindle and adaptor are secured together.

Each block 18 is slidably fitted in the slot 15, each block having a single opening 31 for receiving the pin 30. All of the blocks are a same length, but each of the blocks has the opening positioned a specifically different distance away from one end 32 of the block than on the other blocks. Correspondingly, the pin will thus also be a different distance away from the opposite end 33 of each block, so that, for example, if there were a set of ten blocks, there would be 20 precise different measurements between an end edge and the opening 31. Each of these 20 measurements are precisely indicated at 34 on each side of the opening and which indicates the specific boring diameter of an opening when the particular end of the block is employed during use of the tool.

In operative use, the tool is used as follows: A block is selected that indicates the dimension of the intended size of bore, as for example, 1.091 inch diameter as shown on the block illustrated in FIG. 4. The block is then placed into the slot 17 with the end 32 of the block aligned to abut the slot end 17. The adaptor and spindle and then fitted together with the pin 30 entering the block opening 31, and the spindle and adaptor are then attached together by the screws 25 and 27. Before tightening the screws, the adapter is firmly pushed so that the block edge 32 abuts securely against edge 17, after which the screws are then locked down hard. Thus the central axis of the spindle shank is a precise distance from the axis of bore 20 so that an accurate hole may be bored according to the dimension indicated.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In an improved boring head, the combination of a spindle, an adaptor and a set of blocks one of which is selectively held between said spindle and adaptor; said spindle including a straight shank integral with a flange at one end of said shank, said flange extending transverse to the axis of the spindle and abutting an end of said adaptor, a slot in an outer end face of said flange receiving said selected block, one end edge of said block-receiving slot being a precise measured distance from a central axis of said spindle shank; said adaptor comprising a straight shank having a bore in one end thereof, said bore being adapted to receive a cutting means, an opposite end of said adaptor shank being integral with a flange that abuts said spindle flange, said adaptor flange having a pin protruding from an outer end face thereof which is precisely along a central axis of said bore, said adaptor and spindle being adjustably secured together by a pair of screws inserted through slots in said adaptor flange and engaging threaded openings in said spindle flange and a pilot screw threaded in said adaptor flange engaging a further slot in said spindle flange, all said slots being axially parallel to a longitudinal axis of said block-receiving slot, said block having an opening to receive said pin to thereby position the adaptor relative to the spindle.

2. The combination as set forth in claim 1, wherein opposite end edges of said block are a different precise measured distance from said opening, and a bore dimension relative to a distance of each end from said opening being engraved near said ends, said block end edges selectively being abutted against said block-receiving slot end edge that is a precise measured distance from said spindle central axis.

* * * * *